UNITED STATES PATENT OFFICE.

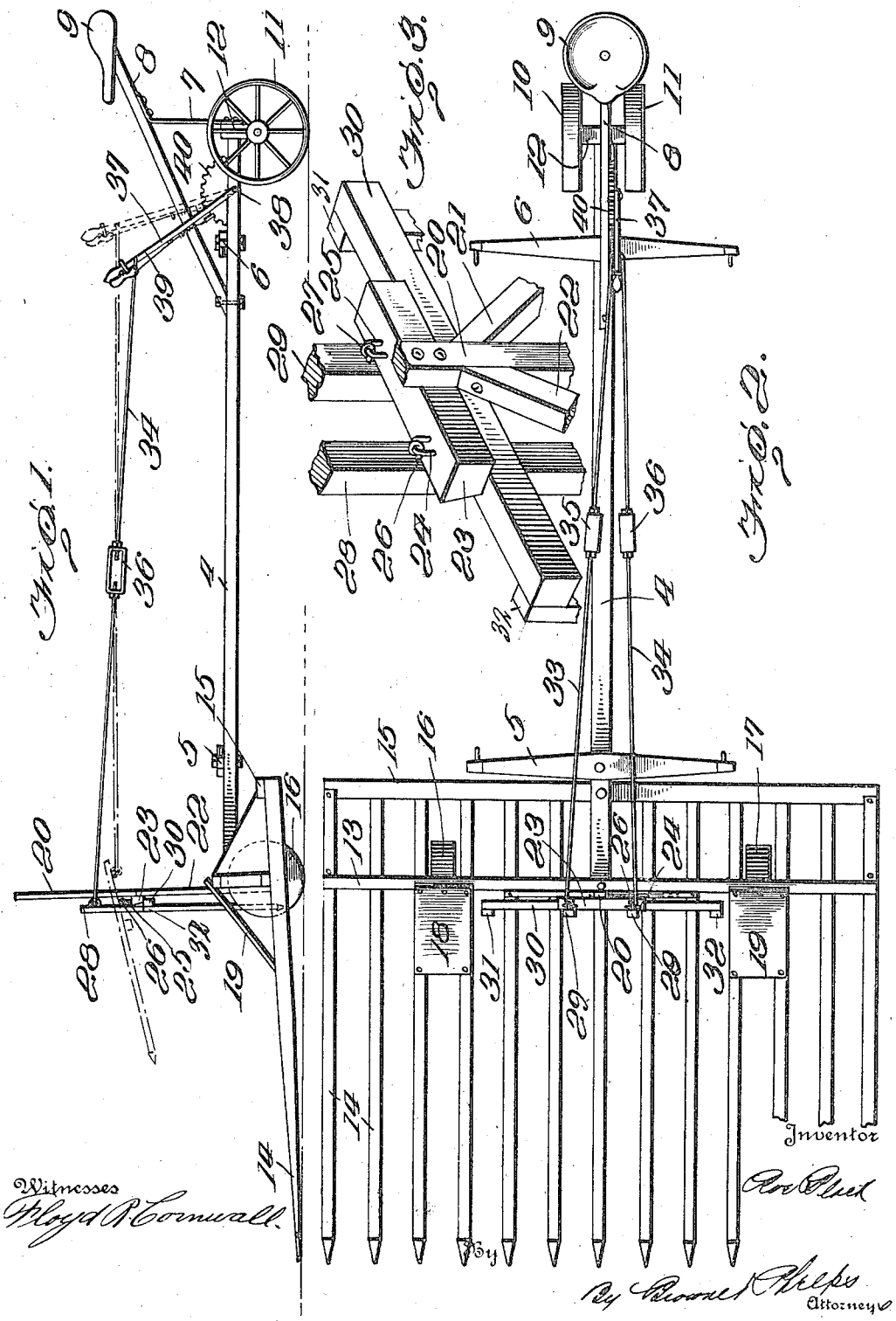

ROE BLACK, OF OSKALOOSA, IOWA.

HAY-RAKE ATTACHMENT.

1,239,763.           Specification of Letters Patent.      Patented Sept. 11, 1917.

Application filed April 14, 1917. Serial No. 162,011.

*To all whom it may concern:*

Be it known that I, ROE BLACK, a citizen of the United States, residing at Oskaloosa, in the county of Mahaska and State of Iowa, have invented certain new and useful Improvements in Hay-Rake Attachments, of which the following is a specification.

This invention relates to hay rakes and more particularly to those of such apparatus adapted to be self-propelled, or horse drawn, and the invention has for its primary object the provision of an apparatus of the character set forth which shall be provided with means adapted to facilitate the unloading of the rake after the same has traversed a certain portion of the field and accumulated thereon a load of hay or similar material.

A further object of the invention is to provide means within reach of the operator for controlling the ejecting mechanism, and also to provide means for adjusting the throw of the ejector mechanism, in order to compensate for wear thereof.

With the foregoing and other objects in view, which will from time to time hereinafter appear, this invention consists in the peculiar combination and arrangements of the various coöperating elements of a hay rake as hereinafter set forth, and more particularly pointed out in the appended claim.

Referring to the accompanying drawings forming a portion of this specification and in which the same reference characters indicate the same parts wherever used, Figure 1 is a side elevation of the apparatus;

Fig. 2 is a top plan view thereof and

Fig. 3 is a detail perspective of the ejector mounting.

4 designates a frame member of any suitable construction carrying thereon horse attaching devices 5 and 6, and having at the end thereof a bracket 7 which supports a member carrying a seat 9 for the operator. The rear end of the member 4 is provided with wheels 10, 11, mounted upon an axle carried by a block 12. The front end of the member 4 engages a cross member 13 to which are attached a plurality of forwardly extending teeth members 14 secured at their inner ends to a cross member 15 and tapering slightly downward, as shown in Fig. 1. The member 13 carries wheels 16 and 17 which are protected by means of guards 18 and 19 extending from a plurality of the teeth members 14 to the member 13, thus covering the forward portion of the wheels. At the approximate center of the rake member formed by the construction above described is an upright 20 supported by braces 21 and 22 and carrying a cross beam 23 upon which are U members 24 and 25 which are engaged by eye-bolts 26 and 27 upon uprights 28 and 29 supported upon a cross beam 30 which also carries uprights 31 and 32. From the members 28 and 29 there extends rearwardly of the apparatus a plurality of rods 33 and 34 carrying turn buckles 35 and 36 respectively and being fastened to a handle 37 pivotally mounted at 38 upon the member 4 and adapted to be controlled by means of a pawl 39 engaging a ratchet quadrant 40 upon the member 4.

The operation of the device is as follows:

By means of any suitable propulsion the apparatus is conveyed across the field in which the hay has already been cut and picks up the hay upon the members 14, the hay piling against the members 31, 28, 29 and 32, until the desired quantity is obtained upon the forward or rake member and it is desired to dump the same. The handle 37 is then operated to cause a rearward pull upon the rods 33 and 34, thus transmitting the pull to the upper portion of the members 28 and 29, causing them to pivot about the U members 24 and 25 and assume the position shown in dotted lines in Fig. 1, whereupon the load of hay is dumped and suitably ejected from the rake carrying member.

I realize that considerable variation is possible in the details of construction and arrangement of parts without departing from the spirit of my invention, and I therefore do not intend to limit myself to the specific form shown and described.

Having thus described my invention what I claim as new and desire to secure by Letters Patent is:

In a hay rake attachment, in combination, a wheel supported frame, a substantially horizontal rake member thereon having relatively long teeth, an upright at the rear of said rake member, a transverse cross member secured to said upright, a cleaning device for said rake member comprising a transverse cross member parallel to said first cross member, a plurality of relatively short vertically disposed cleaning members secured to said second cross member, the central vertical cleaning members being of greater height than the adjacent side cleaning members, means connecting said vertical members of greater height with the first cross member to permit pivotal movement thereon, an operating lever, connections from said vertical members to said lever, and means for adjusting the length of said operating connections.

In testimony whereof I affix my signature in presence of two witnesses.

ROE BLACK.

Witnesses:
 A. L. BLACK,
 ARTHUR BLACK.

Copies of this patent may be obtained for five cents each, by addressing the "Commissioner of Patents, Washington, D. C."